United States Patent [19]
Van Daalen

[11] 3,754,607
[45] Aug. 28, 1973

[54] EQUIPMENT FOR USE IN OFFSHORE WELLS

[75] Inventor: Francois Van Daalen, The Hague, Netherlands

[73] Assignee: Shell Oil Company, Houston, Tex.

[22] Filed: June 14, 1971

[21] Appl. No.: 152,843

[30] Foreign Application Priority Data
June 18, 1970 Great Britain.................... 29,651/70

[52] U.S. Cl.......................... 175/7, 175/57, 166/46, 166/117
[51] Int. Cl........................ E21b 33/13, E21b 15/02
[58] Field of Search.................... 175/6, 7, 8, 9, 10, 175/57; 166/45, 46, 47, 117

[56] References Cited
UNITED STATES PATENTS

| | | | |
|---|---|---|---|
| 3,340,928 | 9/1967 | Brown................................ | 175/7 X |
| 3,196,958 | 7/1965 | Travers et al.......................... | 175/7 |
| 3,643,446 | 2/1972 | Mott.................................. | 175/7 X |

Primary Examiner—Richard E. Moore
Attorney—Theodore E. Bieber

[57] ABSTRACT

A conductor string, suitable to be lowered into an offshore borehole during drilling, is telescopically arranged in a pedestal conductor extending between a buoyancy member and a weighted base. The diameter of the string is preferably equal to the diameter of the upper part of the pedestal conductor.

14 Claims, 11 Drawing Figures

Francois Van Daalen,
INVENTOR

Patented Aug. 28, 1973

Francois Van Daalen

Patented Aug. 28, 1973

Francois Van Daalen

Patented Aug. 28, 1973

Francois Van Daalen
INVENTOR

EQUIPMENT FOR USE IN OFFSHORE WELLS

BACKGROUND OF THE INVENTION

The present invention relates to equipment for use in offshore wells, and in particular to such equipment which can be used with advantage in deep water. Such wells are drilled in the earth's crust either for exploratory purposes or for exploitation purposes. In the latter case, valuable products such as oil and gas may be recovered from subsurface formations via these wells.

More particularly, the present invention relates to equipment for use in offshore wells which are located in deep water, that is water having a depth which divers cannot actually or economically operate.

For solving problems specific to the drilling of wells in deep water, it is known to use a buoyancy member mounted at or near the top of a pedestal conductor which provides at the lower end thereof entrance to the well penetrating into the sea or ocean bottom. Since the wellhead is mounted on the buoyancy member, which is located at a level between the bottom of the sea or ocean and the water level, the wellhead equipment is easily accessible by divers provided that the buoyancy member is arranged at a depth suitable for diving operations.

BRIEF DESCRIPTION OF THE INVENTION

In particular, the present invention relates to a pedestal conductor/buoyancy member assembly which has a weighted base such as a block of concrete connected to the lower end thereof, this base being placed on the sea or ocean bottom at the location where the well is to be drilled. Since the upward force developed by the buoyancy member is insufficient to lift the pedestal conductor and the weighted base from the bottom, the base remains at the location where the well is to be drilled. If currents of large flow rates run at this location, anchoring means may be applied for preventing lateral displacement of the base.

An assembly as described above is known from U.S. Patent No. 3,017,934. A well is drilled by means of this assembly by passing a drillstring with bit through the pedestal conductor provided with buoyancy members, and drilling a hole at the location. When the desired depth has been reached a casing is lowered into the hole, which casing is suspended from the top of the pedestal conductor.

The equipment as known for use in offshore wells that are located below very deep water, have several disadvantages which render this equipment less suitable for the purpose.

One such disadvantage is the long roundtrips required when lowering the bit into and subsequently lifting it from the borehole. The same holds for the time required to lower the casing into the hole. During these operations long lengths of tubing are suspended from the drilling ship or floating drilling platform. It will be appreciated that the longer such operations take, the greater the possibility of deteriorating weather conditions, and the greater the risk of damage to the drill pipe, casing or assembly owing to wave or storm action.

SUMMARY OF THE INVENTION

One object of the present invention is to provide equipment for use in drilling offshore wells, which minimizes the periods during which great lengths of pipes are suspended from the ship (such as during drilling of the hole and placing of the conductor string in this hole).

Another object of the present invention is to provide equipment for use in drilling offshore wells, which is of simple design and can be easily manipulated during the drilling of the well.

A further object of the present invention is to provide equipment for offshore well drilling, comprising an assembly consisting of a buoyancy member, a pedestal conductor and a weighted base, which assembly can easily be retrieved if it is decided to abandon the well.

Still another object of the present invention is to provide equipment suitable for use in drilling an offshore well by means of wellhead equipment placed on a buoyancy member during the drilling process, which offshore well can easily be completed at the sea or ocean bottom.

A further object of the present invention is to provide well equipment for use in offshore wells, wherein the buoyancy of the buoyancy member is used very efficiently in order to obtain a hole having a relatively large diameter.

According to the invention, equipment for use in drilling offshore wells comprises:
a pedestal conductor,
a weighted base connected to the pedestal conductor near the lower end thereof,
at least one buoyancy member connected to the pedestal conductor to support the pedestal conductor in a substantially vertical direction in a body of water, and
a conductor string having a length shorter than the length of the pedestal conductor and telescopically arranged in the lower part of the pedestal conductor.

The equipment may further comprise drilling means having the central axis thereof coinciding with the central axis of the conductor string and suitable for drilling a bore hole having a diameter sufficiently large to allow lowering of the conductor string therein.

The conductor string may have an outer diameter which is smaller than the inner diameter of at least part of that section of the pedestal conductor which is located above the conductor string when the conductor string is in the retracted position with respect to the pedestal conductor.

Means may be provided for coupling the lower end of the pedestal conductor to the upper end of the conductor string when the latter is in the extended position with respect to the pedestal conductor.

BRIEF DESCRIPTION OF THE DRAWING

The invention will now be described by way of example with reference to one embodiment thereof as shown in the drawing in which.

DESCRIPTION OF A PREFERRED EMBODIMENT

Figure 1:
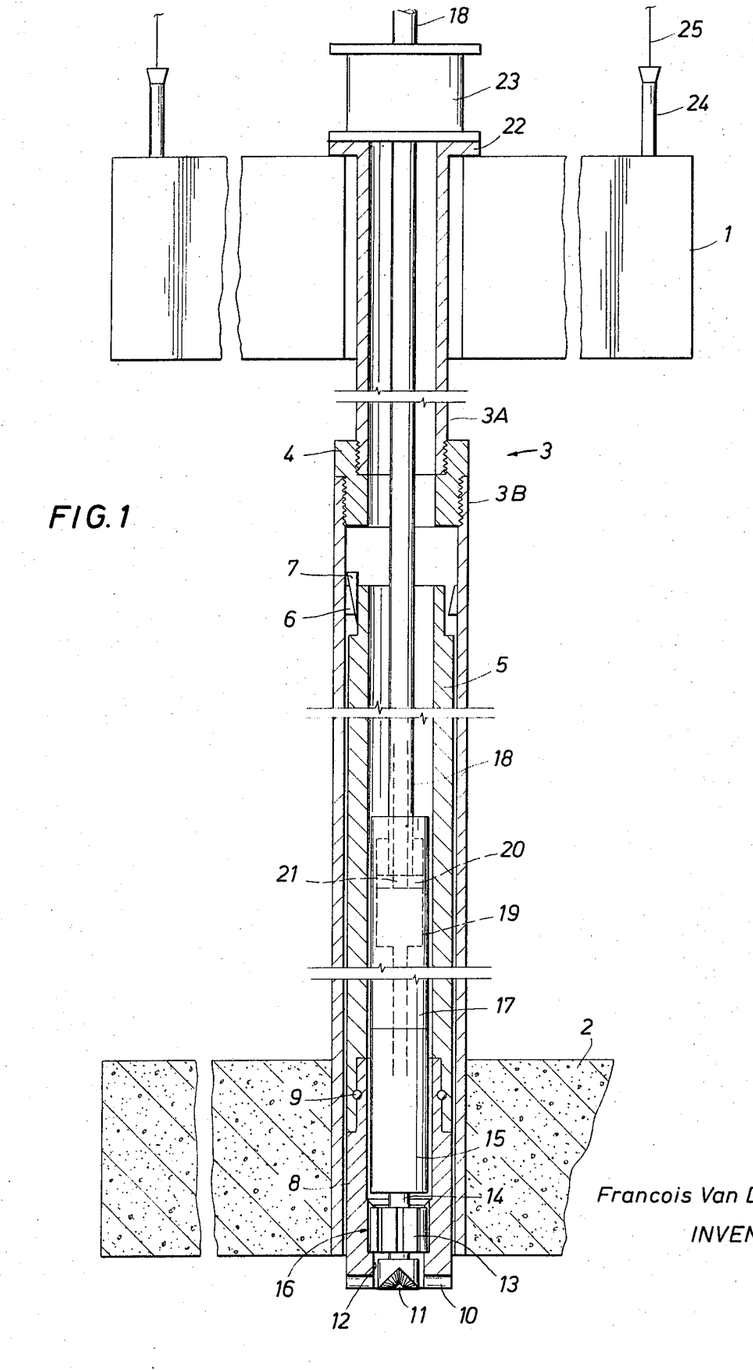
FIG. 1 shows schematically a longitudinal section through equipment according to the invention.

The equipment shown in FIG. 1 comprises a buoyancy member 1, a weighted base 2 and a pedestal conductor 3 extending between the buoyancy member 1 and the weighted base 2, and connected thereto in a suitable manner (not shown). The weighted base 2 may consist of a concrete block. The buoyancy member 1 is of the variable buoyancy type. Preferably, the interior of the buoyancy member communicates with the water in which it is submerged, so that when air is injected into the interior, water will be displaced from the member, which as a result will have its buoyancy increased.

The pedestal conductor 3 consists of two parts having different diameters (3A and 3B), which parts are interconnected by a coupling member 4. In part 3B, a conductor string 5 is telescopically arranged. This string 5 is of approximately the same diameter and has approximately the same wall thickness as part 3A of the pedestal conductor 3. In its retracted position in the pedestal conductor 3, the conductor string 5 is suspended in part 3B of the pedestal conductor 3 by a casing hanger comprising tapered surfaces 6 co-operating with tapered bodies 7, which are slidably arranged with respect to the surfaces 6 and, at the side facing the conductor string 5, are provided with (not shown) teeth suitable to grip the outer wall of the conductor string 5. When the bodies 7 are wedged between the surfaces 6 and the outer wall of the conductor string 5, the conductor string 5 is suspended from the pedestal conductor 3. When the bodies 7 are not in use, they are forced in upward direction by spring means (not shown) so that the conductor string 5 can pass therebetween without the outer wall thereof touching the teeth of the tapered bodies 7. The casing hanger as used in this embodiment of the invention is known per se and hence not described in detail.

The lower end of the conductor string 5 is provided with a casing shoe 8, which is locked in a vertical sense to the conductor string 5 by balls 9 arranged in grooves with semi-circular cross-section and arranged in the walls of the conductor string 5 and the shoe 8. This shoe 8 is rotatably arranged with respect to the conductor string 5, and is provided at its lower end with cutting teeth 10 suitable to cut an annular hole in a formation. In combination with the drilling bit 11, which is arranged in the central opening 12 of the shoe 8, the teeth 10 can drill a bore hole in a formation of a diameter sufficiently large to allow the conductor string 5 to be lowered into the hole.

The shoe 8 and the drilling bit 11 are coupled by means of a splined body 13 co-operating with a splined inner portion 16 of the shoe 8. Like the drilling bit 11, the splined body 13 is arranged on the shaft 14 of the hydraulic turbine 15. The splined body 13 is capable of transmitting rotational as well as axial loads on the splined portion 16.

The turbine 15 is coupled to the lower end of a string of drill collars 17, which string in its turn is connected to the lower end of a drill string 18. Between the strings 17 and 18, a telescopic member (a so-called bumper sub) is provided, comprising a cylinder 19 and a piston 20.

Means (not shown) are provided for pressurizing drilling fluid, which fluid is guided through the interior of the drill string 18, through a conduit 21 in the piston 20, via the lower part of the cylinder 19, through the interior of the string 17 of drill collars, and finally enters the turbine 15. The exhaust fluid from this turbine 15 is passed to the drilling bit 11 and the cutting teeth 10 of the shoe 8 to cool these cutting elements and clean the bottom of the hole being drilled.

That part of the drill string 18 which enters the cylinder 19 and is connected to the piston 20 has a non-cylindrical cross-section and slides through an opening of the same cross-section to prevent rotation between the collars 17 and the drill string 18.

The upper end of the pedestal conductor 3 is connected to the buoyancy member 1 by a flange 22, on which is mounted a wellhead 23. The buoyancy member 1 further carries guide posts 24 having guide cables 25 connected thereto. These cables are kept taut in a vertical direction by constant tension winches (not shown) mounted on board of the drilling ship (also not shown).

The buoyancy member 1 is further provided with means for controlling the buoyancy of this member. To this end flexible conduits may lead from compressors on board of the drilling ship to the interior of the member 1. Injection of compressed air into this interior will displace water therefrom and increase the buoyancy of member 1, whereas bleeding air from the interior will decrease the buoyancy.

The manner in which the equipment shown in FIG. 1 is assembled and applied in drilling a well into a formation underlying a body of water will now be described with reference to FIGS. 2A–H which show the sequence of steps to be carried out.

The various figures show a vertical section through the buoyancy member 1 and the weighted base 2 and that part of the drilling ship 26 where the buoyancy member 1 and the weighted base 2 are tied to the ship 26. The buoyancy member 1 floats on the surface 27 of the body of water 28 overlying the formation 29 to be drilled, and is enclosed by the opening 30 of the ship 26. The weighted base 2 is carried by the buoyancy member 1 and connected thereto by (not shown) means suitable for the purpose.

First of all, the lower part 3B of pedestal conductor 3 is connected to the weighted base 2, which base is disconnected from the member 1 and gradually lowered into the water 28 during assembly of this lower part 3B. When the part 3B of the pedestal conductor 3 has the desired length, the conductor string 5 carrying the shoe 8 at its lower end is lowered therein and finally suspended therein by coupling means 6 and 7 in the manner shown in FIG. 1, so that the lower part of the shoe 8 extends some distance below the lower end of the pedestal conductor 3. Subsequently, the coupling member 4 is screwed onto the top of part 3B of the pedestal conductor 3, and the assembly comprising the weighted base 2, the part 3B of the pedestal conductor 3 and the conductor string 5 is lowered into the water 28 by lengthening the pedestal conductor 3 by adding the tubes of part 3A thereto. This operation ends when the total length of the pedestal conductor is such that the distance between the weighted base 2 (FIG. 2C) and the surface 31 of the formation 29 is equal to the depth to which the buoyancy member 1 should be submerged (FIG. 2E).

When the desired length of the pedestal conductor 3 has been reached (FIG. 2C), the upper end thereof is coupled to the buoyancy member 1 by means of flange 22 as shown in FIG. 1. The wellhead 23 is subsequently mounted on the pedestal conductor 3 and the cables 25 are connected to the buoyancy member 1.

Figure 2A:
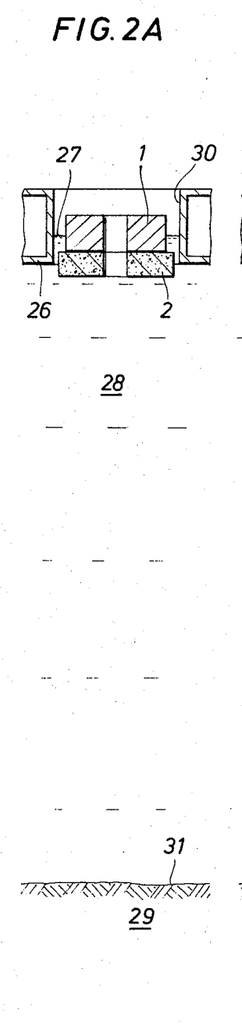
FIGS. 2A–H show schematically the sequence of steps wherein the equipment according to FIG. 1 is assembled and used in drilling an offshore well.
Figure 2B:
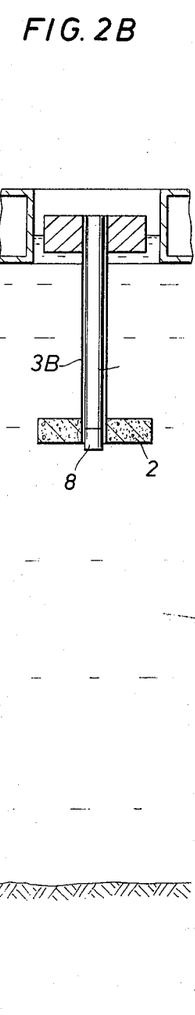
Figure 2C:
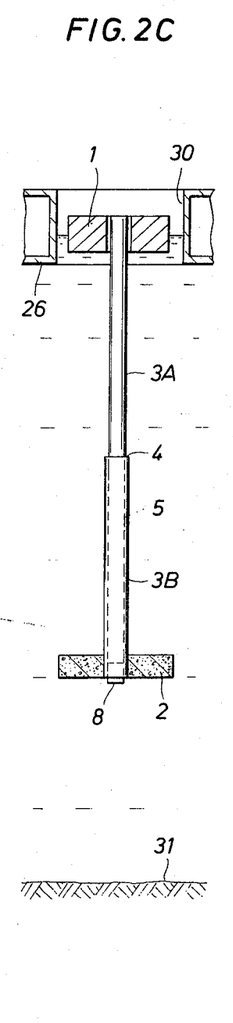
Figure 2D:
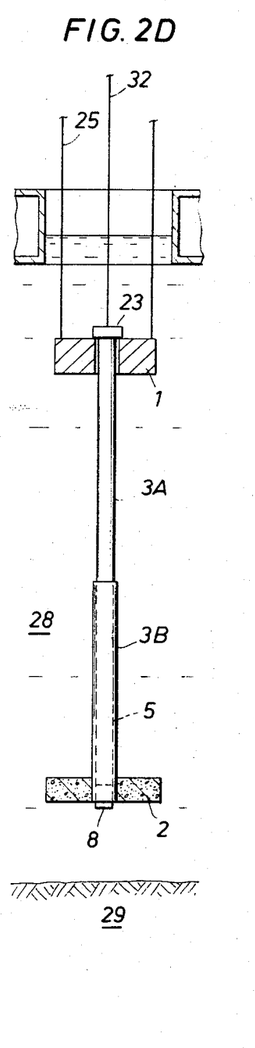
Figures 2E, 2F:
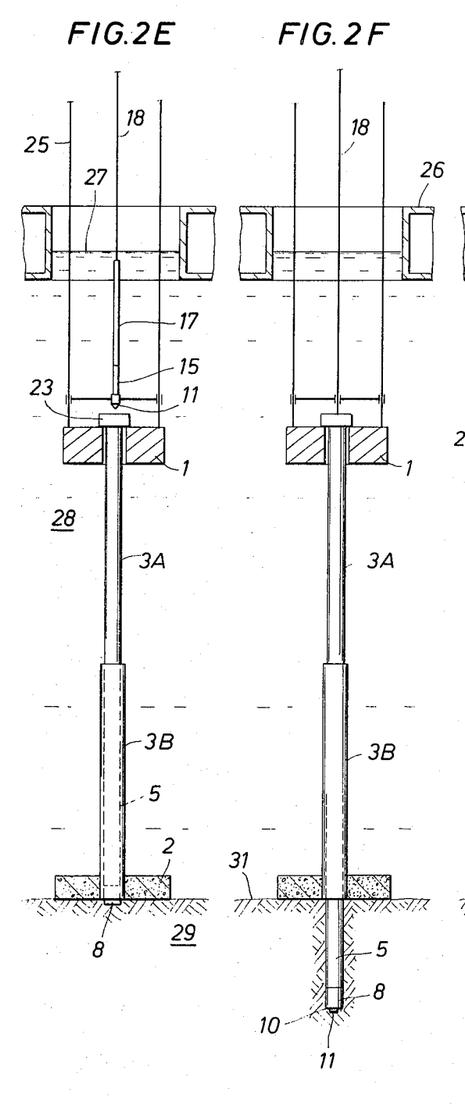

A string of tubing 32 is subsequently connected to the wellhead 23 and the whole assembly is lowered in the water 28 (FIG. 2D) until the weighted base 2 contacts the surface 31 of the formation 29 (FIG. 2E). During this operation, the buoyancy of the member 1 is regulated by controlling the amount of air in the interior of member 1.

Prior to landing the weighted base 2 on the surface 31 of the formation 29, the lower end of the conductor string 5 (which is formed by the shoe 8, FIG. 1) contacts the surface 31. By further lowering of the pedestal conductor 3, the conductor string 5 is displaced relatively with respect to the pedestal conductor 3 and as a result of this displacement is lifted from its supports 6 and 7 (FIG. 1). The tapered body 7, once released, remains in its upper position under influence of spring action, and thus the conductor string 5 remains dislodged from the pedestal conductor 3. In the position shown in FIG. 2E, the conductor string 5 is supported at its lower end by the shoe 8, which rests on the surface 31 of the formation 29.

Subsequently, the load is released from the string of tubing 32 by increasing the buoyancy of the buoyancy member 1, without lifting, however, the weighted base 2 from the bottom 31. Thereafter the string of tubing 32 is uncoupled from the wellhead 23 in a manner known to those skilled in the art and is not described here in detail. The assembly consisting of the buoyancy member 1, the weighted base 2, the pedestal conductor 3 and the conductor string 5 remains in vertical position under influence of the upward force resulting from the buoyancy of the member 1, and the downward force resulting from the weight of the base 2 and the pedestal conductor 3. It will be appreciated that the upward force is smaller than the downward force, and that the weight of the conductor string 5 has no influence on this downward force.

Should strong water currents occur in the body of water 28 in the region where the well is to be drilled, then (not shown) guy cables may be connected to the buoyancy member 1, which cables are provided at their other ends with means suitable for anchoring the cables to the formation 29.

Drilling of the borehole is now initiated by lowering along the guide cables 25 the drilling bit 11, the turbine 15, the drill collars 17 and the drill string 18 into the pedestal conductor 3 through the wellhead 23. This assembly is lowered to a depth at which the splined body 13 co-operates with the splined portion 16 of the shoe 8 (FIG. 1), whereupon drilling fluid is passed to the turbine 15 and the combination of the drilling bit 11 and the cutting teeth 10 on the shoe 8 is rotated on the surface 31 under axial load. The hole then cut by this drilling action (FIG. 2F) has a diameter sufficiently large to allow the entrance therein of the conductor string 5, which string is thus continuously being lowered in the borehole during the drilling thereof, thus preventing deterioration of the hole during, or after the drilling operation. Since the shoe 8 is rotatably connected to the conductor string 5, this string is not subjected to a rotary movement and the whole assembly meets with only a minimum amount of friction when being lowered into the borehole. It will be appreciated that, since the conductor string need not be lowered separately into the hole, this operation is time-saving.

When a depth approximately equal to the length of the conductor string 5 has been reached, the assembly comprising the drill string 18, the collars 17, the turbine 15, the splined body 13 and the drilling bit 11 is lifted from the hole and through the pedestal conductor 3 to the drilling ship 26. Subsequently, tubing with packer means known per se is lowered into the conductor string 5, whereupon conductor string 5 is cemented in the borehole. The cement may be injected to a level where it protrudes between the annular space left between the outer wall of the upper end of the conductor string 5 and the inner wall of the lower end of the pedestal conductor 3.

It will be appreciated that the shoe 8 is left in the hole and cemented therein. The diameter of the central passage 12 (FIG. 1) through the shoe 8 is sufficiently large to allow the passage therethrough of a drill bit 33 (FIG. 2G) which is used for further deepening of the hole. The bit 33 is carried by a turbine 34, which is at the upper end connected to a drill string 35 via drill collars 36. This drilling assembly is guided to the wellhead 23 by means of the cables 25 and subsequently lowered through the pedestal conductor 3, the conductor string 5 and the casing shoe 8 (FIG. 2H) to deepen the hole at a diameter smaller than the diameter of the initial part of the hole.

Drilling and completion may now proceed in one of the manners known per se. Thus the first casing and any subsequent casings to be installed in the hole may be suspended from the wellhead 23 carried by the buoyancy member 1. In order to keep the size of the buoyancy member 1 as small as possible it is preferred, however, to suspend the casings from the conductor string 5 and to bridge the distance between the upper end of the casing through which the hole is further being deepened and the wellhead 23 by a string of tubing which is suspended from the wellhead 23.

Preferably the pedestal conductor 3 should be detachable from the conductor string 5, once the latter has been cemented in the formation 29. Uncoupling may be effected by shooting off the lower end of the part 3B of the pedestal conductor just above the weighted base 2 or by shooting off the upper end of the conductor string 5 just below the weighted base 2. It will be appreciated that in the latter case the shooting point should be above the casing suspension means arranged in the conductor string 5.

Figures 2G, 2H:
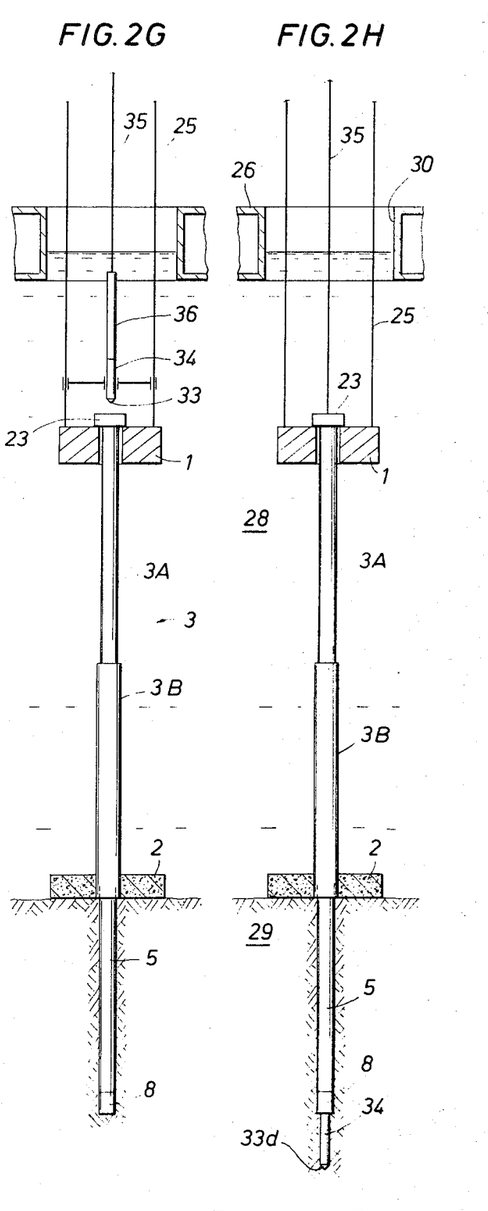

Uncoupling of the pedestal conductor 3 from the conductor string 5 is a very attractive operation for salvaging the conductor 3 and the buoyancy member 1 when the well is to be abandoned. However, it may also be a necessary operation, in particular when the well is to be completed at the surface 31 (or just above the surface 31) of the formation 29. A distance-controlled coupling member is then preferably provided between the pedestal conductor 3 and the conductor string 5. This coupling member is in the coupled position when the conductor string 5 has been fully extended from the pedestal conductor 3 (FIG. 2G). The coupling is uncoupled if removal of the buoyancy member 1, the weighted base 2 and the pedestal conductor 3 is desired.

Alternatively, this coupling member may be arranged between the lower end of the pedestal conductor 3 and the weighted base 2. Preferably, such coupling is combined with a blowout preventer which is of a size sufficient to allow passage of the conductor string 5 therethrough. Such a blowout preventer may be provided with shear rams suitable to shear off any tubular goods in the passage therethrough, if safety should require this.

Whether or not in combination with this blowout preventer, a further blowout preventer may be mounted on the coupling member 4 (FIG. 1) or at some higher level. This blowout preventer may also be provided with shear rams and/or with remote-controlled coupling means capable of uncoupling part 3A of the pedestal conductor 3 from part 3B if this should be desired.

It will be appreciated that once the assembly, consisting of the wellhead 23, the buoyancy member 1, the weighted base 2 and the pedestal conductor 3 has been removed from the conductor string 5, it may be applied again when drilling another well. To this end the buoyancy member 1 is replaced in the opening 30 of the ship 26 (FIG. 2C), whereupon part 3A and the coupling 4 are dismounted from the pedestal conductor 3. Subsequently, a new conductor string 5 with shoe 8 is inserted in part 3B and suspended therefrom (FIG. 2B), whereupon part 3A is again added to part 3B in the manner already described above.

When it is desired to complete the well at the bottom of the body of water 28, the weighted base may be provided with means suitable to guide the wellhead equipment (not shown) to the base 2 so as to couple it to one of the casings or to the conductor string 5. Such guidance means may be of the type known per se, and are hence not described in detail.

It will be understood that the main advantage of the equipment according to the present invention resides in the telescopic arrangement of the conductor string in the pedestal conductor. In this construction, the conductor string is already near the borehole entrance during the drilling of the hole and can be lowered into the borehole during or directly after the drilling of this hole. If the conductor string would have to be introduced into the pedestal conductor after the hole has been drilled, this would decrease the safety of the drilling operation. This can be made clear as follows. Lowering of tubular goods or other equipment into the well will as a rule only be undertaken when weather conditions are good, because the relative displacement of the ship with respect to the well should be as small as possible during such lowering since the equipment suspended from the ship is in contact with the well. As there is always a possibility of deteriorating weather conditions during such operation, any lowering of equipment involves a certain risk. However, by application of the present invention, the conductor string need not to be lowered separately, the safety of the drilling operation as a whole is increased.

Although the conductor string 3 shown in the above example has a stepped diameter, the invention is not limited thereto but also includes the use of pedestal conductors having the same diameter over the entire length thereof. A stepped diameter is, however, more attractive since it reduces the cost of the pedestal conductor. Further it reduces the weight of the pedestal conductor and consequently the size of the buoyancy member.

The conductor string 5 may be of a diameter different from the diameter of the upper part 3A of the pedestal conductor 3 and have a wall thickness which is also different from the wall thickness of this part 3A. Preferably, however, the same size of casing pipe is used for the conductor string 5 and for part 3A of the pedestal conductor 3.

The buoyancy member may be of any type suitable for the purpose. In view of the weight thereof, it is preferred to use a member which at the lower side thereof has a communication between its interior and the ambient water. Such design reduces pressure differences over the walls of the buoyancy member to a great extent and allows a simple and relatively cheap construction of the member. If desired more than one buoyancy member may be applied. Further, the buoyancy members may be distributed along the length of the pedestal conductor or be formed by using a double-walled tubing as pedestal conductor.

Figure 3A:
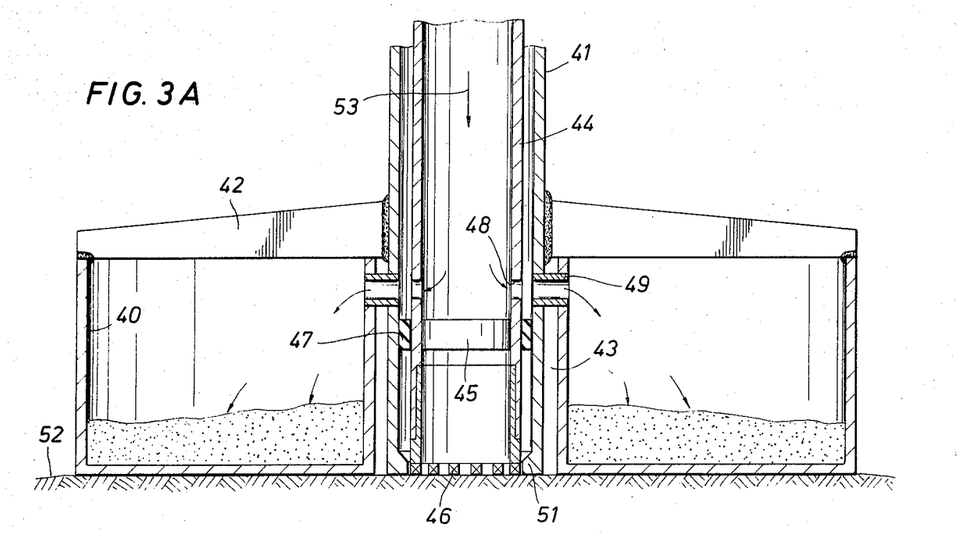
FIGS. 3A and 3B show schematically a vertical section through a weighted base and the lower part of a pedestal conductor. The conductor string is shown in the retracted position in FIG. 3A of this drawing, and in the extended position in FIG. 3B of this drawing.
Figure 3B:
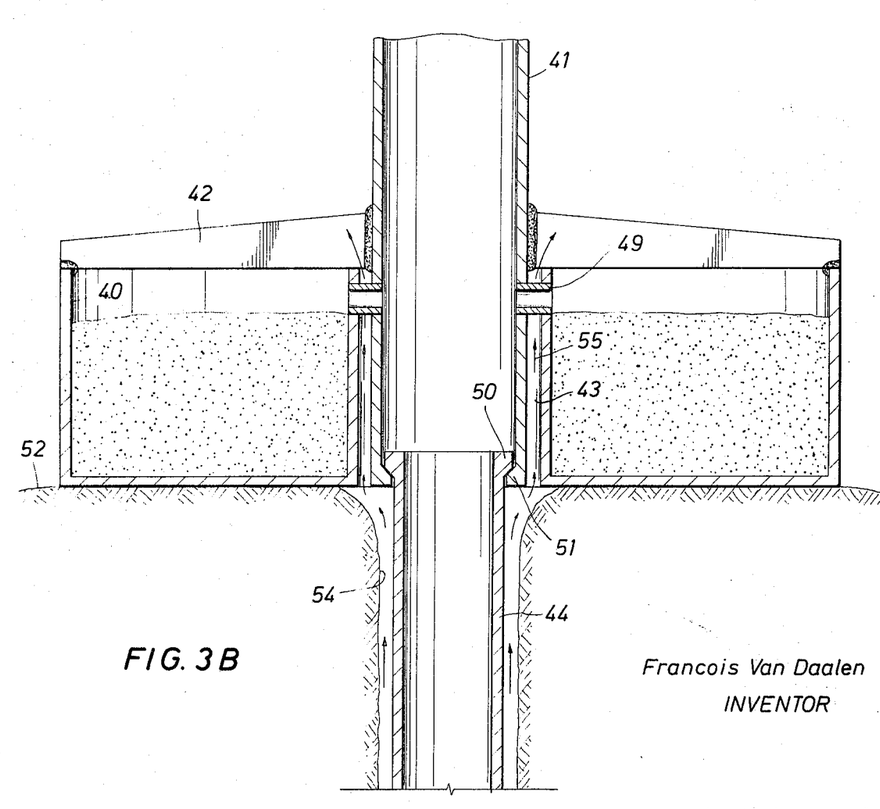

The weighted base is preferably made of concrete but the invention is not limited to this construction as will be illustrated hereafter with referance to FIG. 3. If desired, a coupling may be arranged for connecting the conductor string to the weighted base (and thus coupling this string indirectly to the pedestal conductor) when the conductor string is in its extended position with respect to the pedestal conductor. This coupling can be uncoupled if it is necessary to remove the assembly comprising the buoyancy member, the pedestal conductor and the weighted base when abandoning the well or completing the well at a level near the sea or ocean bottom.

As shown in the example described with reference to FIG. 1, the splined body 13 is carried in the splined section 16 of the shoe 8. Since the weight of the drill collars forms the major part of the load on the bit combination comprising the bit 11 and the cutting elements 10 on the shoe 8, neither the shoe 8, nor the drilling bit 11 can stay behind during the drilling progress. This can also be achieved by coupling the drill string to the conductor string (e.g. by a remote-controlled coupling member arranged at a level near the upper end of the conductor string), mounting the drill collars and the bumper sub in the drill string at a level above this coupling member, and designing the splined connection 13 and 16 such that it will transmit rotational loads only.

It will be appreciated that the use of a coupling member between the drill string and the conductor string is also suitable for breaking the connection 6 and 7 between the conductor string 5 and the pedestal conductor 3, since by lifting the drill string 18 the conductor string 5 will be lifted simultaneously which results in an uncoupling of the connection 6, 7. This manner of operation is very desirable when owing to the softness of the sea bottom the conductor string will not be lifted with respect to the pedestal conductor when the assembly is placed on the sea bottom.

The application of the present invention is further not restricted to the coupling 6 and 7 as used for suspending the conductor string 5 from the pedestal conductor 3 during assembly of the various parts forming the equipment according to the invention and the lowering of the assembly to the sea or ocean bottom. Any other coupling suitable for the purpose, for example, shear pins, may be used.

It will further be appreciated that the turbine 15 and/or the turbine 34 may be replaced by an electric motor or any other actuating device suitable for the purpose. Also, the turbine 15 may be removed and the drill bit 11 may be actuated by rotating the drill string 18. The same applies to the turbine 34.

The application of the invention is not restricted to the use of a rotatable casing shoe as shown in the example. Instead of the shoe 8 and the central bit 11, a bit may be applied which is provided with cutting elements which can be extended in a radial direction so as to cut a hole having a diameter larger than the diameter of this bit when having the elements in the retracted position. The application of this type of bit is preferably combined with a coupling arranged between the drill string and the conductor string. The conductor string is then suspended from the drill string and will subsequently be lowered continuously into the hole during the drilling operation.

The length of the conductor string will be chosen in connection with the formation to be drilled and may be between 600 and 1500 feet. The length of the pedestal conductor depends on the depth of the sea or ocean where the equipment according to the invention is to be applied. It is generally equal to the depth of the sea or ocean minus about 600 feet (which latter distance corresponds to a depth outside the wave region but still suitable for diving operations).

The pedestal conductor 3 may be kept free from water during assembly (so as to reduce the weight thereof) by arranging a drillable plug in the lower end thereof. The casing shoe is then located at a level above this plug, and the plug is drilled by the combined action of the teeth of the casing shoe and the central bit after the conductor string has been uncoupled from the pedestal conductor.

As has already been remarked above, the application of the invention is not restricted to the use of a concrete block as a weighted base. Reference is now made to FIGS 3A and 3B which show schematically a vertical section through an alternative construction of a weighted base. This base consists of a container 40 open at its upper end. The container is doughnut-shaped and connected to the pedestal conductor 41 by arms 42 welded thereto. An annular opening 43 is provided between the inner wall of the container 40 and the pedestal conductor 41.

A conductor string 44 is telescopically arranged with respect to the pedestal conductor 41. In FIG. 3A, the conductor string 44 is shown in the retracted position with respect to the pedestal conductor 41, whereas in FIG. 3B the conductor string 44 is shown in the fully expanded position with respect to the pedestal conductor 41. The passage through the interior of the conductor string 44 is closed off by a drillable plug 45 at the lower end thereof but at a level above the casing shoe 46, which shoe is carried by the conductor string 41 and rotatably arranged with respect thereto as already described with reference to FIG. 1. An annular sealing member 47 is arranged to close off the annular passageway between the conductor string 44 and the pedestal conductor 41 at a level below the opening 48 in the wall of the conductor string 44 and the pipe 49 forming a communication between the container 40 and the interior of the pedestal conductor 41. It will be appreciated that the plug 45 can be removed by the action of the central bit (not shown) when the latter is rotated and lowered through the conductor string 44. The central bit may be actuated by a turbine (not shown) and the drilling action is discontinued after the plug 45 has been drilled through, so as to allow coupling of the central bit with the casing shoe 46.

As shown in FIG. 3B, the upper end of the conductor string 44 is provided with a collar 50 which co-operates in the expanded position of the conductor string 44 with a collar 51 carried by the lower end of the pedestal conductor 41. If desired, suitable sealing means (not shown) may be arranged between the pedestal conductor 41 and the conductor string 44 to seal the passage therebetween in the expanded position of the latter.

As shown in the FIG. 3A, the container 40 is filled with heavy material, such as sand when supported by the sea bottom 52, by circulating water laden with sand particles through the pedestal conductor 41, conductor string 44, opening 48, and pipe 49 (arrows 53). The sand particles are deposited in the container 40, thus forming a base which is sufficiently heavy for the purpose.

When the desired amount of sand has been fed to the container 40, the conductor string 44 is uncoupled from the pedestal conductor 41, and the central bit (not shown) is lowered into the conductor string 44 and actuated so as to drill out plug 45. Thereafter the central bit is coupled to the shoe (in the manner described with reference to FIG. 1). Subsequently the hole 54 is drilled and the conductor string 44 is continuously lowered into this hole, thereby destroying the annular sealing member 47. The return flow of mud passes through the annular space 43 as indicated by arrows 55. When cementing the conductor string 44 in the hole 54, the cement may be injected in an amount sufficient to fill the annular opening 43.

It will be appreciated that the container 40 may also be filled at a moment when it is not located on the bottom of the sea or ocean, hanging, for example, from the buoyancy member when the latter is still floating on the surface of the water (FIG. 2A).

I claim as my invention:

1. Equipment for use in offshore wells, comprising:
   a pedestal conductor having a lower and upper portion;
   at least one buoyancy member connected to the upper portion of the pedestal conductor to support the pedestal conductor in a substantially vertical direction in a body of water;
   a weighted base connected to the lower portion of the pedestal conductor and near the lower end;
   a conductor string having a length shorter than the length of the lower portion of the pedestal conductor and telescopically arranged in the lower portion of the pedestal conductor; and
   coupling means for coupling the upper end of the conductor string to the lower portion of the pedestal conductor when the conductor string is in a retracted position within the pedestal conductor.

2. Equipment according to claim 1, comprising drilling means having the central axis thereof coinciding with the central axis of the conductor string and suitable for drilling a borehole having a diameter sufficiently large to allow lowering of the conductor string therein.

3. Equipment according to claim 1, wherein the conductor string has an outer diameter which is smaller than the inner diameter of at least part of that section of the pedestal conductor which is located above the conductor string when the conductor string is in the retracted position with respect to the pedestal conductor.

4. Equipment according to claim 1, having coupling means for coupling the lower end of the pedestal conductor to the upper end of the conductor string when the latter is in the extended position with respect to the pedestal conductor.

5. Equipment according to claim 1, wherein means are provided for coupling the upper end of the conductor string to the weighted base when the conductor string is in the extended position with respect to the pedestal conductor.

6. Equipment according to claim 1, wherein the weighted base is a concrete block.

7. A method for installing a conductor string in an offshore well, comprising the steps of:
  connecting a weighted base to a buoyancy member;
  lowering the lower part of a pedestal conductor through said buoyancy member and connecting the lower pedestal conductor to said weighted base;
  disconnecting said weighted base from said buoyancy member and gradually lowering said weighted base and lower pedestal conductor into the water until a predetermined depth is reached;
  lowering a conductor string carrying a rotatable shoe at its lower end through said lower pedestal conductor until said shoe extends some distance below said lower pedestal conductor and suspending said conductor string in said lower pedestal conductor;
  connecting the upper part of a pedestal conductor to the lower part of the pedestal conductor and lowering said upper and lower pedestal conductor as an assembly through said buoyancy member in said water until a desired depth is reached;
  coupling the upper pedestal conductor to said buoyancy member by suitable means such that a wellhead may be mounted on the upper end of said upper pedestal conductor;
  lowering the weighted base, upper and lower pedestal conductors, conductor string and buoyancy member in the water until said weighted base contacts the surface of the formation to be drilled;
  lowering a drill string carrying a drill bit at its lower end through said wellhead, said pedestal conductor and said conductor string;
  drilling a borehole of sufficient diameter that said conductor string is lowered in the borehole cut by said drill bit until the desired depth is reached; and
  removing said drill string and drill bit from said borehole and cementing said conductor string in said borehole.

8. The method of claim 7 wherein the upper and lower pedestal conductors are lowered in the water to a depth where the distance between the weighted base and the surface of the formation is equal to the depth to which the buoyancy member is submerged.

9. The method of claim 7 wherein the weighted base, upper and lower pedestal conductors, conductor string and buoyancy member are lowered in the water by a suitable string of tubing.

10. The method of claim 7 wherein the buoyancy is regulated by the amount of air contained within the buoyancy member.

11. The method of claim 7 wherein the drill string is guided by suitable guide line means as it is being lowered to said wellhead.

12. The method of claim 7 wherein the weighted base is filled with a heavy material by circulating water laden with said heavy material into said weighted base.

13. The method of claim 12 wherein said heavy material is sand.

14. The method of claim 7 wherein the upper end of the lower pedestal conductor remains above the buoyancy member when the weighted base and lower pedestal conductor are lowered into the water until a predetermined depth is reached.

* * * * *